D. McC. CALVIN.
Bee-Hives.

No. 145,048.

Patented Dec. 2, 1873.

Witnesses

Inventor

UNITED STATES PATENT OFFICE.

DAVID McC. CALVIN, OF EAST FALLOWFIELD, PENNSYLVANIA.

IMPROVEMENT IN BEE-HIVES.

Specification forming part of Letters Patent No. 145,048, dated December 2, 1873; application filed September 27, 1873.

*To all whom it may concern:*

Be it known that I, DAVID McCONAHEY CALVIN, of East Fallowfield, in the county of Crawford and State of Pennsylvania, have invented an Improvement in Bee-Hives, my object being to make a hive that can be readily divided laterally, and that can be enlarged or contracted to suit the size of the swarm and still retain two flaring sides to accommodate the habits of the bees, as set forth in the patent that was granted to me April 8, 1873, No. 137,530.

Figure 1:
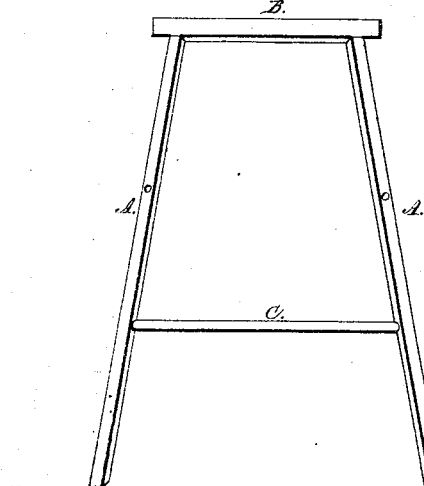

Figure 1 in drawing represents a side view of a separate sash, which is formed of four pieces.

The two sides A A and the top B are made of stuff about one and a half inch square, beveled on their inner edges to a sharp central edge, to furnish a central fastening for the comb; but the cross-stay C is made thinner to allow free passage for the bees between the bars.

Figure 2:
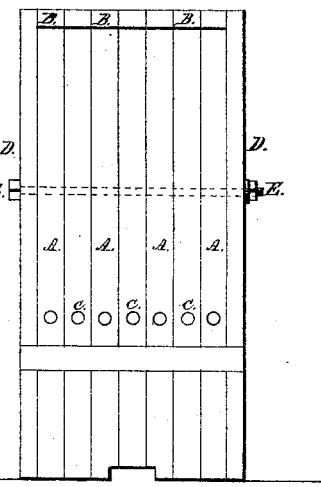

Fig. 2 shows the hive complete.

The sides D D are made of one piece each, and the whole is bolted together with the rods E E; or it can be held together with clamps over the outer corners, or any equivalent device. The sashes and sides D D can all be bored with a templet, and be thus quickly put together or the parts interchanged when it is desired to take out or put in the brood-comb or any other section of the hive. This hive is intended to take the place of the hive proper in the patent referred to, but is of itself a hive complete when it is desired to dispense with the outer case.

What I claim is—

The sashes so made that when secured together they form the top and two sides of the hive, tapering from the bottom to the top, which, in combination with the sides D D and the rods E E, or their equivalents, complete the hive, substantially in the manner and for the purpose specified.

D. McC. CALVIN.

Witnesses:
 THOS. S. MINNISS,
 REUBEN C. FREY.